United States Patent [19]

Legge

[11] Patent Number: 4,770,839
[45] Date of Patent: Sep. 13, 1988

[54] REVERSE PARISON DRAPING FOR BLOW MOLDING

[75] Inventor: Richard C. Legge, Pittsford, N.Y.

[73] Assignee: John D. Brush & Co., Inc., Rochester, N.Y.

[21] Appl. No.: 945,020

[22] Filed: Dec. 22, 1986

Related U.S. Application Data

[63] Continuation-in-part of Ser. No. 868,294, May 28, 1986.

[51] Int. Cl.⁴ .................. B29C 49/18; B29C 49/30; B29C 49/04
[52] U.S. Cl. .................. 264/526; 264/515; 264/529; 264/531; 264/534; 264/540; 425/525; 425/532
[58] Field of Search .............. 264/529, 531, 532, 528, 264/536, 537, 539, 540, 500, 571, 572, 526, 515, 534; 425/296, 297, 302.1, 305.1, 527, 531, 532, 525

[56] References Cited

U.S. PATENT DOCUMENTS

| | | | |
|---|---|---|---|
| 3,334,164 | 8/1967 | Samuels et al. | 264/90 |
| 3,372,429 | 3/1968 | Kato | 18/5 |
| 3,452,125 | 6/1969 | Schurman et al. | 264/89 |
| 3,636,151 | 1/1972 | Nagai | 264/89 |
| 3,736,201 | 5/1973 | Teraoka | 156/145 |
| 3,819,789 | 6/1974 | Parker | 264/534 |
| 3,944,643 | 3/1976 | Sato et al. | 264/97 |
| 4,029,234 | 6/1977 | Johnson, Jr. et al. | 264/540 |
| 4,035,461 | 7/1977 | Korth | 264/295 |
| 4,423,000 | 12/1983 | Teraoka | 264/524 |
| 4,510,116 | 4/1985 | Peters et al. | 264/529 |

FOREIGN PATENT DOCUMENTS 58-203022 11/1983 Japan ........................ 264/531

Primary Examiner—Jan H. Silbaugh
Assistant Examiner—Neil Michael McCarthy
Attorney, Agent, or Firm—Stonebraker, Shepard & Stephens

[57] ABSTRACT

A double-walled plastic box 20 is molded from a single parison 50 in an unlimited depth by closing and holding a bottom region of the parison at the bottom of a cavity 30, bringing together parts of a core 40 above the cavity to close off an upper region of the parison, moving the core, the cavity, or both vertically to position the core within the cavity and invert the parison so that a lower region of the parison forms an outside wall of the box against an inside surface of the cavity and an upper region of the parison forms an inside wall of the box against an outer surface of the core. The parison is then blown into a double-walled box 20 in the shape of an enclosed space between the cavity and the core.

13 Claims, 4 Drawing Sheets

REVERSE PARISON DRAPING FOR BLOW MOLDING

RELATED APPLICATIONS

This sole application is a continuation-in-part of copending joint parent application Ser. No. 868,294, filed 28 May 1986, entitled DRAPED PARISON BLOW MOLDING, the disclosure of which is hereby incorporated by reference into this application.

BACKGROUND

The most efficient way of molding double-walled boxes has been to blow mold them from a single parison formed laterally into a molding space between a cavity and core. This limits the depth of such boxes to approximately one-half their width. Greater depths for blow molded double-walled boxes have long been sought, and the need for this has produced several suggestions. Nagai U.S. Pat. No. 3,636,151 suggests two parisons arranged side by side and blown into box halves joined together along a seam line; and U.S. Pat. applications Ser. Nos. 827,865 and 828,243, assigned to the assignee of this application, suggest a way of blow molding deep, double-walled boxes in two parts that are later joined together. In both of these solutions, the production measures relating to the seam lines add to the expense of the boxes.

For the subject matter of the copending parent application Ser. No. 868,294, a co-inventor and I discovered a way that a deep, double-walled box can be blow molded from a single parison that is closed and draped downward over a core so that a leading portion, next to the core, becomes an inside wall of the box; and a succeeding portion, surrounding the core, becomes an outside wall of the box. Outer mold parts then close around the parison draped over the core, and the parison is blown in the cavity between the core and the outer mold parts to form a double-walled box that is unlimited in depth.

For the subject matter of this application, I have discovered that parison draping can be reversed to drape a parison into a cavity that has an inner surface forming an outside wall of the box; parts of a core can close above the cavity, pinching off an upper region of the parison; then bringing the core and cavity together arranges the bottom half of the parison along the outside wall of the box against the cavity and arranges the upper half of the parison along the inside wall of the box against the core. The double-walled box can be blown to conform to the space between the cavity and core; and, again, the box can have an unlimited depth and no seams.

My invention seeks economical, effective, and reliable blow molding of double-walled boxes that are unlimited in depth and are blown in a single piece from a single parison. My way of accomplishing this includes molding methods and equipment and results in a uniquely formed, double-walled box. Although my way of making deep, double-walled boxes was to satisfy a need for blow molded boxes having interwall spaces that can be filled with a concrete type of fire resistant insulation material, my invention is not limited to such uses and can be applied to deep, double-walled boxes made for other purposes, such as thermally insulated ice chests, for example. Also, although this application refers to the blown product as a "box", it need not have a box shape or be rectangular in cross section; and it can have a circular, elliptical, or other cross section for a shape that might not ordinarily be called a "box". Regardless of the shape, however, the blown product is double walled, relatively deep from its bottom to its open end, and formed of a single parison draped between a cavity and a core.

SUMMARY OF THE INVENTION

My way of blow molding a single parison into a deep, double-walled box includes: closing a bottom region of the parison at the bottom of a mold cavity; bringing together parts of a core above the cavity to pinch off an upper region of the parison; vertically moving the core, the cavity, or both to position the core within the cavity so that a lower region of the parison above the closed bottom forms an outside wall of the box against an inner surface of the cavity and a region of the parison below said closed upper region forms an inside wall of the box against an outer surface of the core. The inside surface of the parison can be lubricated before the core and cavity are moved together; and the parison can be ballooned and deballooned as necessary to invert the parison between the core and cavity as the movement occurs. Once the parison has been inverted into the closed space between the core and cavity, it is blown to conform to that space and form a double-walled box, unlimited in depth. My invention includes blow molding equipment for accomplishing all these functions and the deep, double-walled box that is produced, with a leading pinch-off region formed in an outside wall of the box at a closed bottom region of the box and with the parison extending from there along outside walls of the box, around an open end of the box, and along inside walls of the box to a trailing pinch-off region arranged on an inside wall of the box at the closed bottom region of the box opposite the leading pinch-off region.

DRAWINGS

DETAILED DESCRIPTION

The copending parent application shows a parison draped downward over a core and then confined within outer mold parts forming a cavity around the core so that the parison can be blown into a double-walled box. The invention of this application reverses the parison draping of the parent application in the sense that the parison is first lowered into a cavity into which a core is inserted, by raising the cavity, lowering the core, or doing both, so that a lower half of the parison forms an outside wall of the box and an inverted upper half of the parison forms an inside wall of the box. The reverse draping of this application, as well as the draping of the parent application, both use similar blow molding technology for forming and lowering parisons, pinching off and clamping parisons, lubricating the insides of parisons, ballooning and deballooning parisons, and separating blown, double-walled boxes from mold parts.

Figure 1:
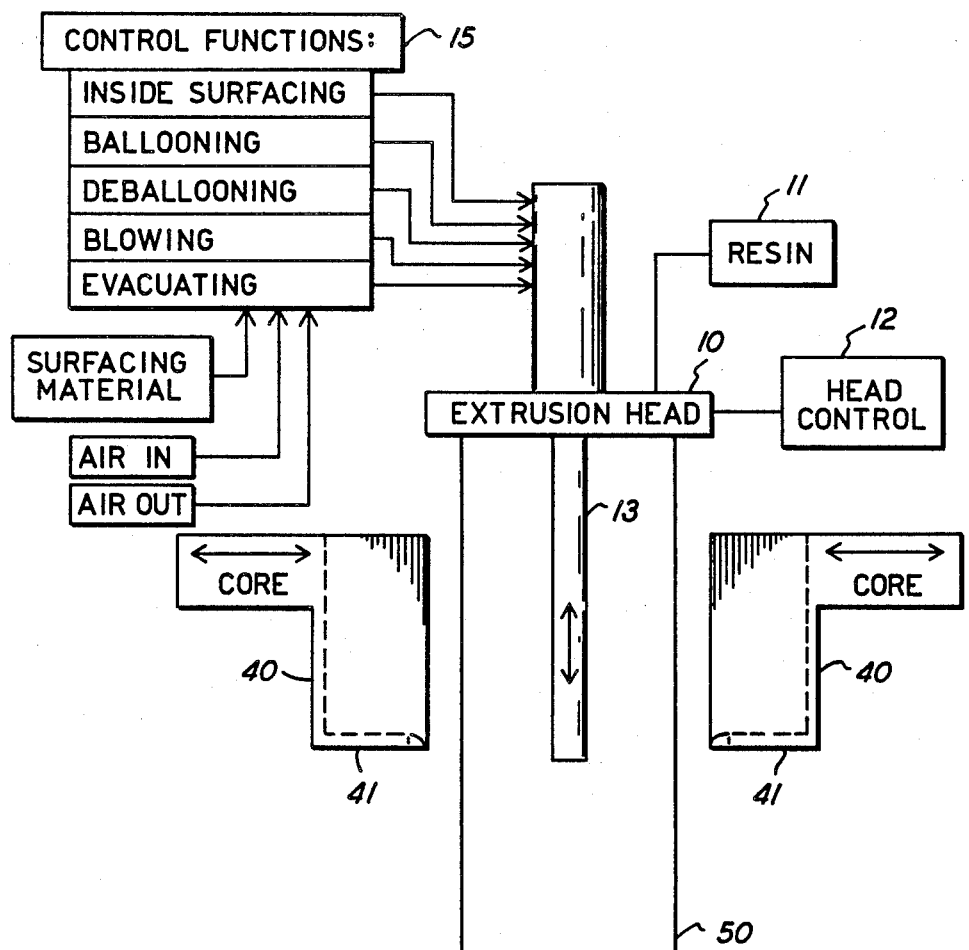
FIG. 1 is a schematic view of blow molding equipment showing a parison closed off and clamped in a cavity below a core.

A machine for blow molding deep, double-walled boxes according to my invention preferably includes some special functions that are shown in FIG. 1 and are not repeated in the other Figures. The extrusion head 10 is fed with plasticized resin from a source 11 that can include an accumulator (not shown), and a head control 12 regulates the lowering of a parison 50 from extrusion head 10. Blow pin 13, arranged within parison 50, is preferably movable vertically relative to head 10, but also can be arranged in positions other than the one shown in FIG. 1. Also provided, preferably via blow pin 13, are control functions 15, involving air movement in and out of parison 50, and coating the inside surface of parison 50 with a material that prevents it from sticking to itself. These control functions include: delivering the surfacing material at the proper time for coating a region of the inside surface of parison 50 that might contact itself; delivering air to the interior of the closed parison for ballooning it to a large enough size to surround and receive core 40 during draping; deballooning parison 50 by evacuating some of its interior air to reduce the ballooned size of the parison; blowing the parison between cavity 30 and core 40 for shaping the parison to a double-walled box; and evacuating air from the blown box to facilitate its separation from mold parts. These functions need not all be accomplished via blow pin 13, and they can be divided between two or more pins, any of which can be located at various places to communicate with the inside of parison 50.

Figure 2:
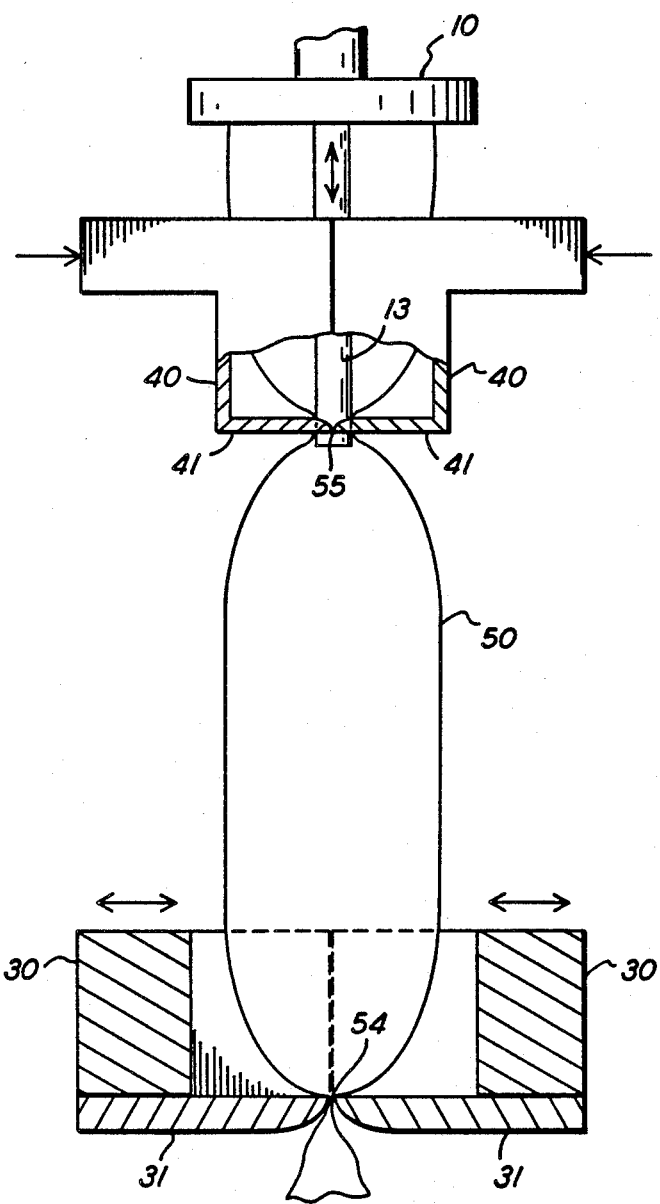
FIG. 2 is a schematic view, similar to FIG. 1, showing the core closed above the cavity, where it pinches off an upper region of the parison.
Figure 3:
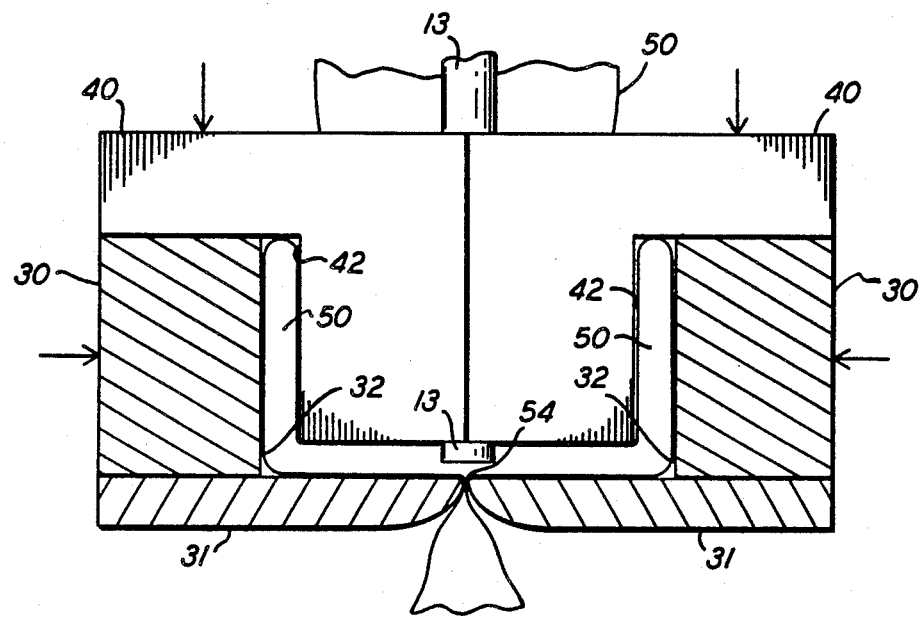
FIG. 3 is a schematic view showing the core and cavity brought vertically together to form the parison into the general shape of the inner and outer walls of a box ready for blowing.

In the blow molding sequence illustrated in FIGS. 1-3, a lower region 54 of parison 50 is closed off and held between clamp jaws 31 that are arranged movably, as indicated by their arrows, at the bottom of cavity 30. Two parts of a core 40 are arranged above cavity 30; and in their open position, as shown in FIG. 1, core parts 40 allow parison 50 to lower to the bottom of cavity 30 where parison 50 is pinched closed and held at leading pinch-off region 54 by movable clamp jaws 31.

So long as the lower region of parison 50 is securely closed where it rests at the bottom of cavity 30, it may not be necessary for parison 15 to be held there by any clamp jaws. Moreover, any clamp for holding or pinching off a lower region of parison 50 at the bottom of cavity 30 may have jaws that hinge or move in ways other than the sliding motion illustrated for jaws 31.

Core parts 40 then close together, as shown in FIG. 2, around parison 50 to pinch off and close an upper region 55 of parison 50. For this purpose, core parts 40 are preferably hollow as illustrated, and their bottom regions 41 form pinch-off jaws that squeeze parison 50 closed, and preferably hold it in position, at upper pinch-off region 55 when core parts 40 close together as indicated by their arrows. Blow pin 13, preferably extending below the bottoms 41 of core 40 into the closed space below upper pinch-off region 55, provides a means for ingress and egress to the otherwise closed parison 50. Lubricating material, such as an oil, or powered inorganic material, such as calcium carbonate, can be sprayed into parison 50 from pin 13 for lubricating the inside walls of parison 50 to prevent these walls from sticking together during the draping process. Also, air admitted through pin 13 can balloon parison 50 if necessary to enlarge it enough to surround and receive core 40, and air can be evacuated via pin 13 for deballooning parison 50 if necessary to prevent it from enlarging beyond the confines of the space between cavity 30 and core 40.

Regions of parison 50 below lower pinch-off region 54 and above upper pinch-off region 55 are waste material for recycling, and core 40 can have an upper pinch-off or cut-off device for severing away an upper waste end of parison 50. Clamp jaws 31 can be formed to cut away waste below leading pinch-off 54, while holding parison 50 in place at the bottom of cavity 30.

Figure 5:
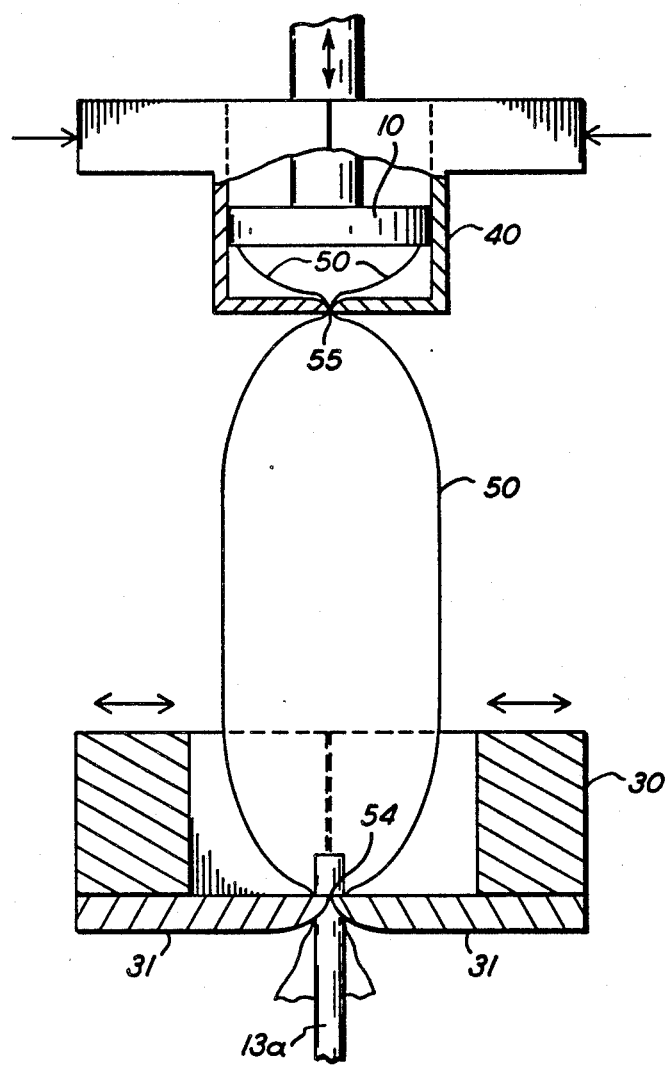
FIG. 5 is a schematic view, similar to FIG. 2, showing alternative blow molding equipment according to the invention.

To reduce the parison waste between extrusion head 10 and upper pinch-off region 55, hollow core 40, as shown in FIG. 5, can be made to surround extrusion head 10 so that extrusion head 10 is well below the top of core 40 and just above upper pinch-off region 55 when core 40 closes. The feasibility of such an arrangement depends on factors such as the size of core 40, the size of extrusion head 10, the desired size of parison 50, and the practicality of adjusting the parison size by ballooning and deballooning.

Cavity 30 and core 40 are brought vertically together, from the position of FIG. 2 to the position of FIG. 3, either by lowering core 40, raising cavity 30, or possibly doing both. By lubricating the inside of parison 50 and using air ingress and egress via pin 13 for controlling the size and girth of parison 50, parison 50 can be draped or inverted into the space between cavity 30 and core 40, as shown in FIG. 3, where the lower half of parison 50 extends along an inner surface 32 of cavity 30 and an upper half of parison 50 extends along an outer surface 42 of core 40. In this position, cavity 30 and core 40 are closed and clamped together, and a double-walled box is blown via air from pin 13 to conform to the space between cavity 30 and core 40. Blow pins for accomplishing this can be arranged in positions other than the one occupied by the illustrated blow pin 13, and an alternative blow pin 13a, arranged at the bottom of cavity 30, is shown in FIG. 5 to illustrate one alternative possibility. Cavity 30 and core 40 can be clamped together and cooled in generally known ways during the blow molding process, and the blown, double-walled box can be removed from the separated mold parts by conventional measures.

Figure 4:
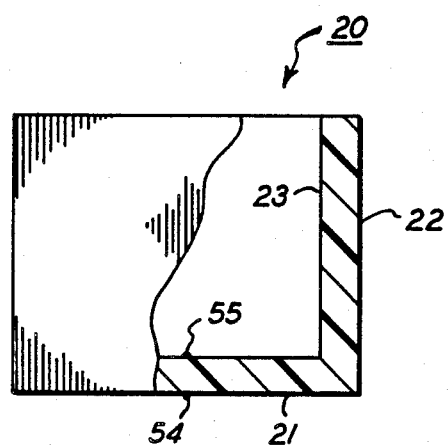
FIG. 4 is a partially cut-away view of the box formed with the apparatus and method of FIGS. 1–3.

The result, as schematically shown in FIG. 4, is a deep, double-walled box 20 having a closed bottom 21, an outside wall 22, conforming to the inner surface 32 of cavity 30, and an inside wall 23, conforming to outer wall 42 of core 40. The leading or lower pinch-off region 54 appears in the outside wall of box 20 at its closed bottom 21, and the upper or trailing pinch-off region 55 occurs opposite pinch-off region 54 on inside wall 23 at the closed bottom 21 of box 20. The box formed by this invention, like the box formed with the invention of the copending parent application, is unlimited in depth and can have a depth substantially greater than one-half its width.

Permanently connecting the outer walls of cavity 30, surrounding the blow molded box, makes cavity 30 simple and strong, without being expensive, and also eliminates lines caused by cavity-parting planes at the exterior of the box. A line left by clamp jaws 31 is relatively unnoticeable, because of being at the bottom of the box, and the sides of the box can be unmarred by any lines. A draft angle in the side walls of cavity 30 is unnecessary for removing the blown box from cavity 30, and mold-clamping pressure is greatly reduced when the outer walls of cavity 30 are permanently connected. Since the walls of cavity 30 cannot expand outward under blow pressure, and since the walls of core 40 can easily be made to resist collapsing inward under blow pressure, mold clamping pressure only needs to maintain the vertical relationship between core 40 and cavity 30. By designing the extrusion head and the core so that core 40 can surround head 10 in a closed position as shown in FIG. 5, parison waste between core 40 and head 10 is minimized, making the reverse draping arrangement of this application comparably feasible to the draping arrangement of the copending parent application.

I claim:

1. A method of blow molding a double-walled box, said method comprising:
   a. closing a bottom region of a parison and disposing the closed bottom region of said parison in the bottom of a cavity;
   b. bringing together parts of a core above said cavity to close off an upper region of said parison;
   c. moving one of said core and said cavity vertically to bring said core within said cavity so that a lower region of said parison above said closed bottom region forms an outside wall of said box against an inside surface of said cavity and a region of said parison below said closed upper region forms an inside wall of said box against an outer surface of said core; and
   d. blowing said parison into said double-walled box in the shape of an enclosed space between said cavity and said core.

2. The method of claim 1 including closing and holding said bottom region of said parison with a clamp arranged in said bottom of said mold cavity.

3. The method of claim 1 wherein said core is hollow and closes off said upper region of said parison at a bottom region of said core when said parts of said core close together.

4. The method of claim 3 wherein said hollow core closes around an extrusion head forming said parison so that said extrusion head and said parison are spaced below a top region of said core.

5. The method of claim 1 including extending a blow pin into an inside region of said parison in said enclosed space between said cavity and said core.

6. The method of claim 1 including ballooning and deballooning said parison to allow said parison to surround said core and stay within said cavity while said vertical movement occurs between said core and said cavity.

7. The method of claim 1 including lubricating the inside wall of said parison before causing said vertical movement between said core and said cavity.

8. A method of blow molding a parison within a space between a cavity and a core, said method comprising:
   a. disposing a closed bottom region of said parison at a bottom region of said cavity;
   b. pinching off and holding an upper region of said parison at a bottom region of said core disposed above said cavity;
   c. moving one of said core and said cavity to position said cavity around said core so that said parison is positioned in said space and an upper half of said parison extends along an outside surface of said core and a lower half of said parison extends along an inside surface of said cavity; and
   d. blowing said parison in said space to form a double-walled box.

9. The method of claim 8 including lubricating an inside surface of said parison before positioning said cavity around said core.

10. The method of claim 8 including ballooning and deballooning said parison to facilitate positioning said cavity around said core.

11. The method of claim 8 including using a clamp arranged in a bottom region of said cavity for closing and holding said bottom region of said parison.

12. The method of claim 8 including moving parts of said core apart while lowering said parison into said cavity and closing said parts of said core above said cavity for pinching off and holding said upper region of said parison.

13. The method of claim 8 including positioning said core to surround an extrusion head for said parison when said core is closed.

* * * * *